United States Patent [19]

Hansen

[11] 4,277,132

[45] Jul. 7, 1981

[54] AUTOMATIC BIAXIAL SUN TRACKING MECHANISM FOR SUN RAY UTILIZATION DEVICES

[76] Inventor: Paul A. Hansen, 435 Dogwood Rd., West Columbia, S.C. 29169

[21] Appl. No.: 35,425

[22] Filed: May 2, 1979

[51] Int. Cl.³ .............................................. G02B 7/18
[52] U.S. Cl. ...................................................... 350/83
[58] Field of Search ................. 350/83, 289, 292, 293, 350/296, 299; 126/424, 425

[56] References Cited

U.S. PATENT DOCUMENTS

| 4,011,854 | 3/1977 | Brantley et al. | 126/425 |
| 4,106,485 | 8/1978 | Polley | 350/299 |
| 4,139,286 | 2/1979 | Hein et al. | 350/83 |
| 4,171,876 | 10/1979 | Wood | 350/292 |

*Primary Examiner*—Jon W. Henry

[57] ABSTRACT

The instant invention is an automatic biaxial sun tracking mechanism for use with sun ray utilization devices. Said devices are mounted on said invention, said devices forming no specific part of said invention.

The invention is comprised of four principal parts: (1) a mount structure for properly positioning and supporting said sun ray utilization devices, (2) a declination shaft, (3) a polar shaft and (4) a suitable shaft-connecting means.

Operation of the invention is as follows: Said shaft-connecting means is caused to rotate about the longitudinal axis of said polar shaft one revolution per day. Said shaft-connecting means is either fixed to a rotating polar shaft or rotatably connected to a fixed polar shaft. Said declination shaft is rotatably connected to said shaft-connecting means and is caused to rotate one revolution per year. The angle between two said shafts is principally determined by the maximum angular difference between the earth's equatorial plane and the sun's ecliptic plane. Said mount structure is connected by suitable means to said declination shaft. The combination of rotations about the longitudinal axes of the two said shafts results in fully biaxial (daily and seasonal) sun tracking.

Provisions, in the form of partial modifications, are made for corrective compensation to the otherwise uniform drive means and for the directing of concentrated sun rays toward a remote and stationary target.

8 Claims, 12 Drawing Figures

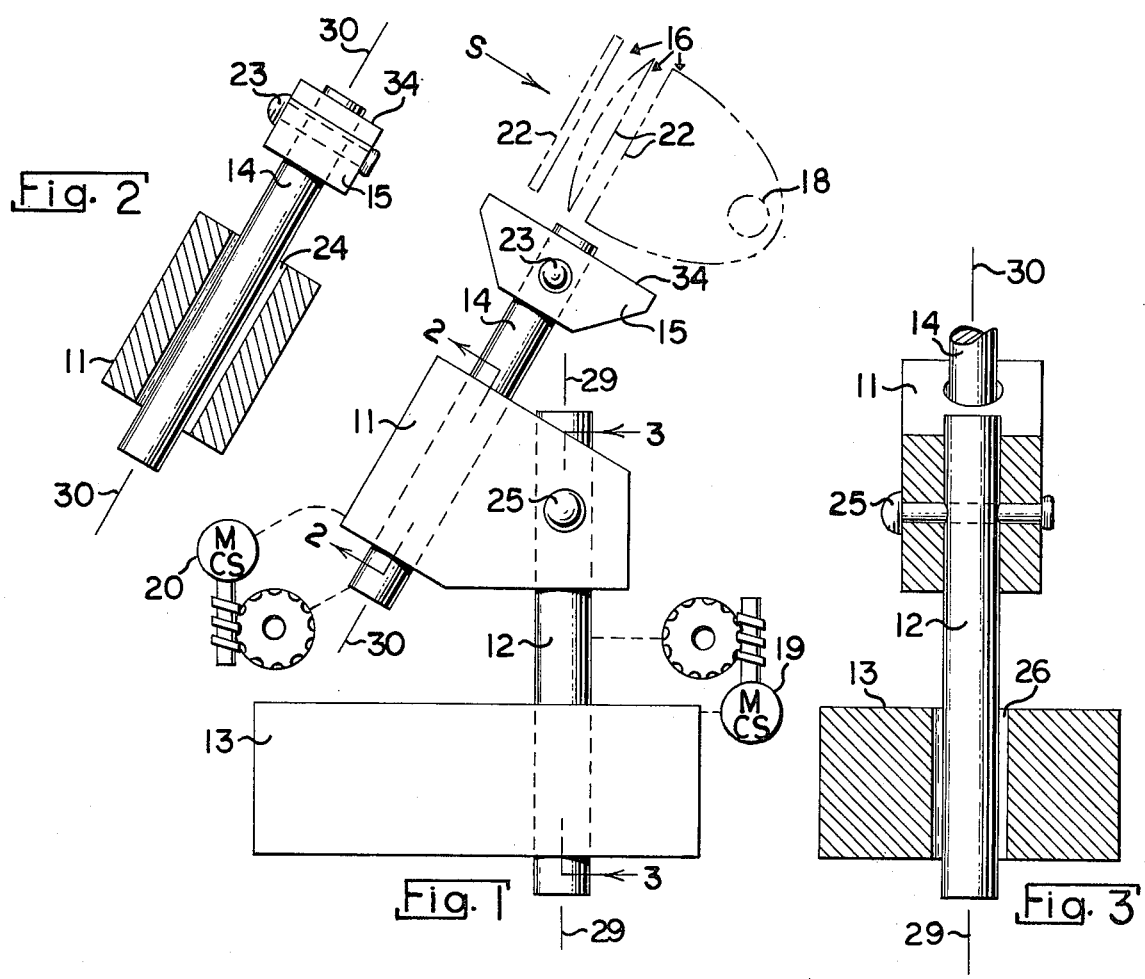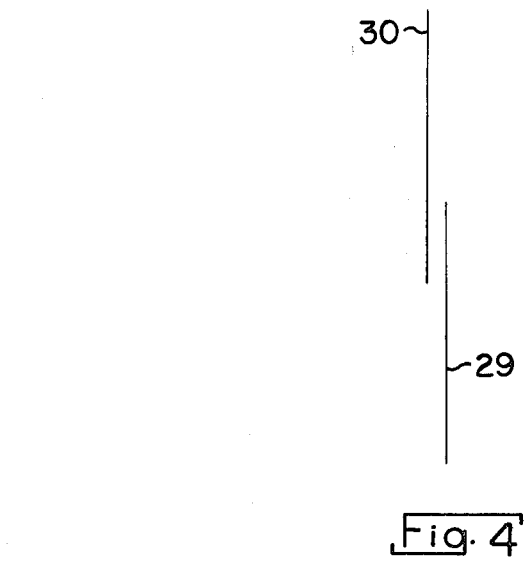

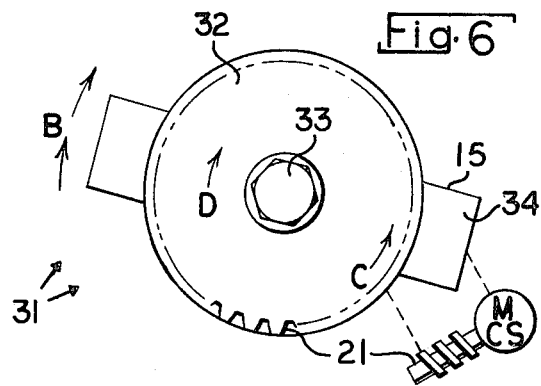
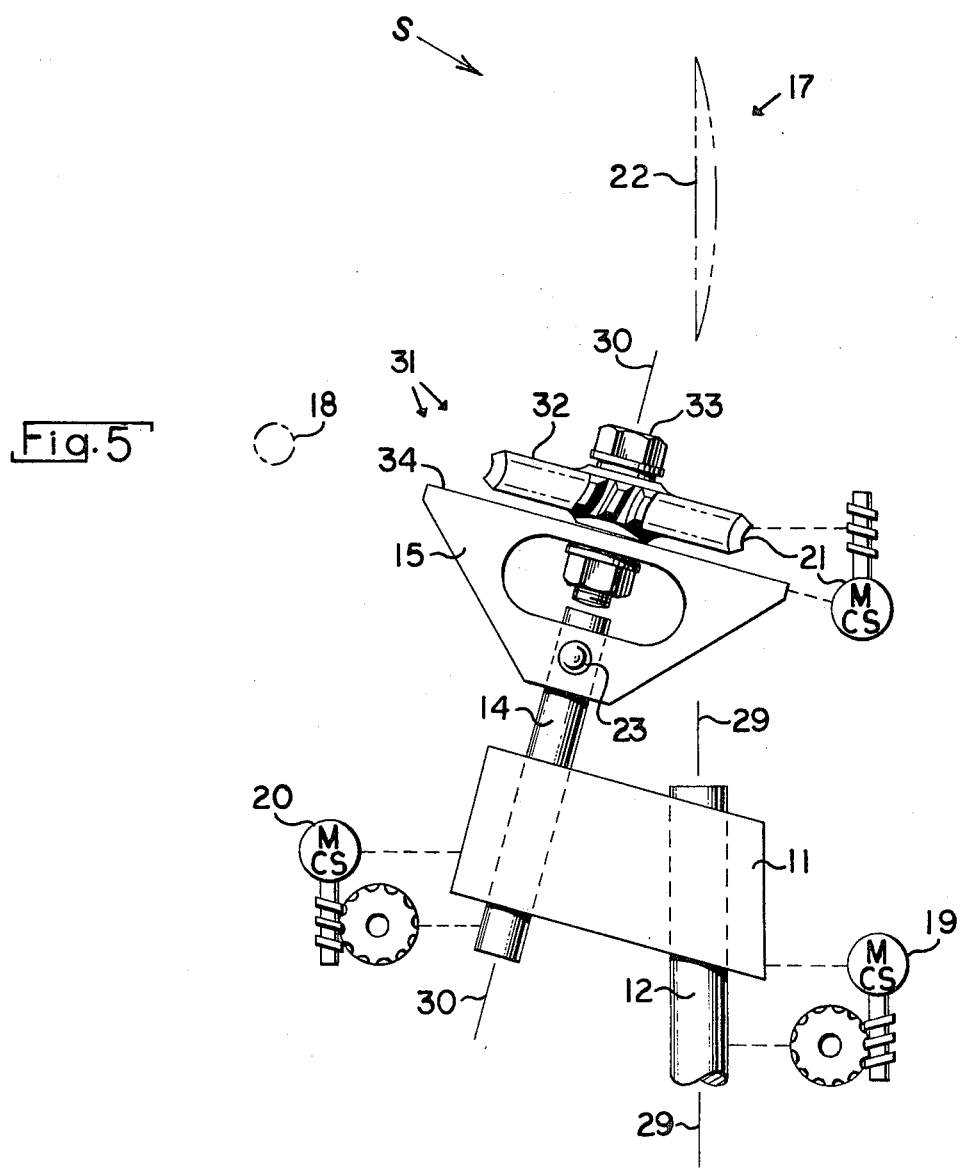

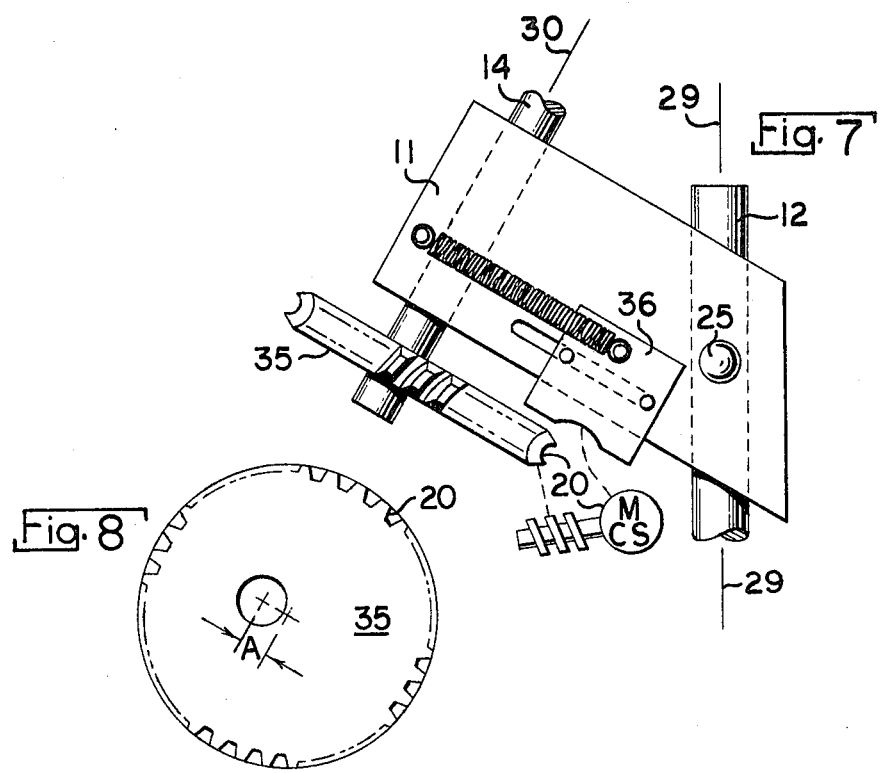
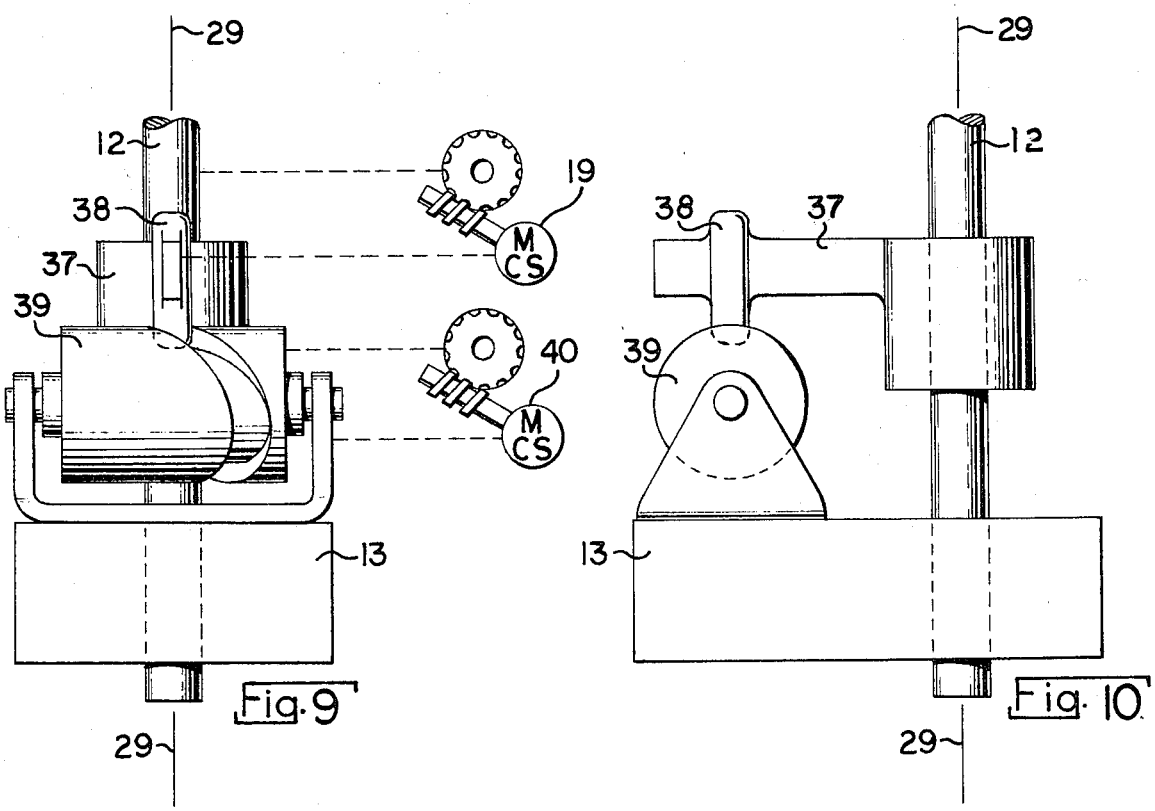

AUTOMATIC BIAXIAL SUN TRACKING MECHANISM FOR SUN RAY UTILIZATION DEVICES

CROSS REFERENCE

Herein is disclosed an automatic biaxial sun tracking mechanism for sun ray utilization devices. The applicant presently has a similar invention pending in the Patent Office (Ser. No. 889,215) now U.S. Pat. No. 4,195,905.

The instant invention is different from and an improvement upon foregoing noted invention and existing patents in that it operates on the basic principle of the equatorial mount with the novel addition of a declination shaft which is used to rotate a sun ray utilization device mount structure one revolution per year while a polar shaft is used to rotate a shaft-connecting means one revolution per day, thereby providing long range, accurate and automatic sun tracking in both right ascension and declination courses.

The invention disclosed herein constitutes a substantial improvement over previously patented inventions involving sun tracking mechanisms:

1. It is simpler with fewer components.
2. It can be of relative small size.
3. Also, the instant invention lends itself to the same simple and accurate mechanical corrective compensating means used in my pending application.
4. Also, the instant invention offers more versatility than previous patents because of its adaptation as an heliostat.
5. Also, the instant invention may be used with a variety of sun ray utilization devices.

BRIEF SUMMARY

The instant invention operates on the basic principle of the equatorial mount with the novel addition of a declination shaft which is used to rotate a sun ray utilization device mount structure one revolution per year while a polar shaft is used to rotate a shaft-connecting means one revolution per day, thereby providing long range, accurate, and automatic sun tracking for any appropriate sun ray utilization device in both right ascension and declination courses.

The invention has its primary usage with focusing or concentrating collectors with a receiver target, the heat absorbed by said target being harnessed for any variety of appropriate uses such as residential heating, absorption cooling, conversion to electricity, etc.

Additionally, the tracking mechanism may be modified for operation as an heliostat. The heliostat configuration is ideal for solar telescopes, solar furnaces, visual navigation aids, as well as other imaginable applications.

Extremely accurate sun tracking is possible by the incorporation of corrective compensating means applied to the main rotational means of the sun tracking mechanism.

DESCRIPTION OF THE SEVERAL VIEWS

FIG. 1 is a side elevational view embodying the basic form of the invention as it is used with sun ray collectors.

FIG. 2 is an auxiliary view of the invention's declination shaft wherein section is taken substantially as indicated by line 2—2 of FIG. 1.

FIG. 3 is a front elevational view of the invention's polar shaft and declination shaft oriented in a common plane wherein section is taken substantially as indicated by line 3—3 of FIG. 1.

FIG. 4 is a front elevational view depicting the declination shaft axis and polar shaft axis in parallel, rather than common, planes.

FIG. 5 is a side elevational view depicting a partial modification of the invention as it is used with sun ray reflectors.

FIG. 6 is a plan view of the modified sun ray reflector mount structure depicted in FIG. 5.

FIG. 7 is a side elevational view depicting a partial modification of the invention with means for corrective compensation applied to the means for rotation of the sun ray collector mount structure.

FIG. 8 is a plan view of the worm gear eccentrically positioned to facilitate means for rotation of the sun ray collector mount structure with corrective compensation.

FIG. 9 is a front elevational view depicting a partial modification of the invention with means for corrective compensation applied to the means for rotation of the shaft-connecting means.

FIG. 10 is a side elevational view of FIG. 9.

DETAILED DESCRIPTION

I. Of Basic Parts

Figure 11:
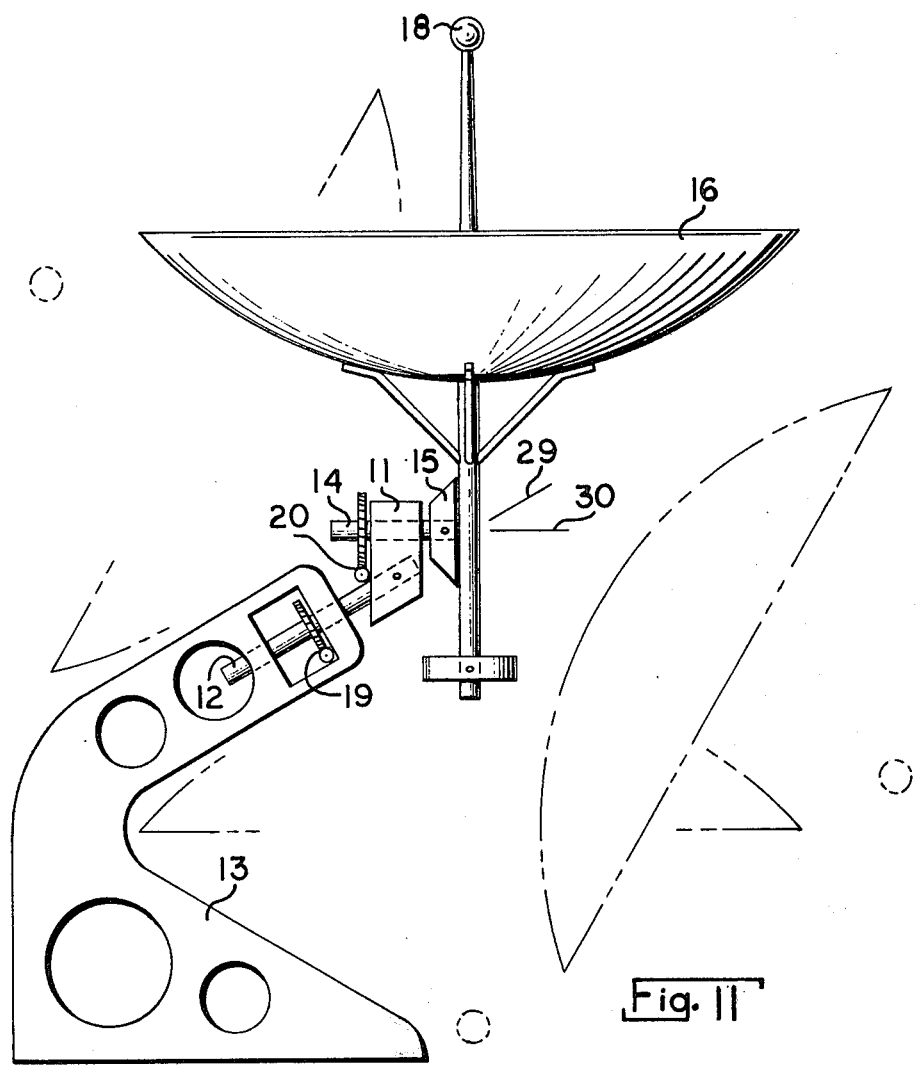
FIG. 11 is a side elevational view of a preferred embodiment of the invention as it is used with a parabolic or spherical dish type collector, wherein more realistic proportions for collector, tracking mechanism and support structure are illustrated.

Having reference to the drawings, FIGS. 1–12 inclusive, my invention has a shaft-connecting means 11, a polar shaft 12, a support structure 13, a declination shaft 14, a mount structure 15 for positioning and supporting sun ray collectors 16 and sun ray reflectors 17 in continuous orientation with the sun and a receiver target 18, and suitable means for rotation 19, 20 and 21 as required. Arrows "S" depict the direction of the sun's rays. Sun ray collector 16 may be a magnifying glass, Fresnal lens, dish, absorption panel, etc. Sun ray reflector 17 may be a curved or flat surface mirror or several flat segments, etc.

A. Referring to FIGS. 1–3 inclusive, the basic form of the invention as it is used with sun ray collectors 16 is illustrated, wherein the relationship of the sun, the center of a reference plane 22, and said receiver target 18 form one straight line, and:

1. said mount structure 15 is fixed to said declination shaft 14 by suitable means 23,
2. said declination shaft 14 is rotatably connected to a shaft-connecting means 11 by means of a bearing support 24, and said declination shaft 14 has suitable means 20 for rotation relative to said shaft-connecting means 11,
3. said shaft-connecting means 11 is fixed to a polar shaft 12 by suitable means 25,
4. said polar shaft 12 is rotatably connected to a support structure 13 by means of a bearing support 26, and said shaft-connecting means 11 has suitable means 19 for rotation relative to said support structure 13 by reason of its connection to said polar shaft 12, and 5. said support structure 13 has a suitable base (not illustrated) to which it is fixed.

C. Referring to FIG. 4 only, polar and declination shaft axes, 29 and 30 respectively, when viewed from the front may lie in parallel planes rather than in common planes as depicted in FIG. 3.

D. Referring to FIGS. 5 and 6 inclusive, a partial modification of the invention as it is used with sun ray reflectors 17 is illustrated, wherein the relationship of sun, reference plane 22, and an externally mounted stationary receiver target 18 form two lines having the center of said reference plane 22 common to both said lines, and both said lines lie in a revolving plane and intersect said reference plane 22 at equal angles according to the principle of incidence and reflection, thereby requiring:

1. a modified angular relationship between polar shaft 12 and declination shaft 14, and
2. a modified mount structure, generally designated 31, having an upper element 32 rotatably connected by suitable means 33 and having suitable means 21 for rotation relative to mount structure 15.

E. Remaining FIGS. 7-12 are fully discussed in sections III. and IV. of this detailed description.

II. Of Basic Operation

Having described the principal parts of the invention, the basic operation thereof may be summarized as follows by again referring to the previously discussed FIGS. 1-6 inclusive:

A. Polar shaft 12 is oriented with its longitudinal axis 29 parallel to the earth's axis of rotation, and said polar shaft 12 has suitable means 19 to rotate shaft-connecting means 11 at a rate of one revolution per day in a direction opposite the earth's axial rotation.

B. Declination shaft 14 has its longitudinal axis 30 oriented in a plane common to (see FIG. 3) or parallel to (see FIG. 4) said polar shaft axis 29, and said declination shaft 14 is held in a fixed angular relationship to said polar shaft 12, said angular relationship being equal to the maximum angular difference between the earth's equatorial plane and the sun's ecliptic plane when used with said sun ray collectors 16, and the angular relationship being exactly one-half of the aforesaid angular difference when used with said sun ray reflectors 17.

C. Mount structure 15 has an upper surface 34 substantially perpendicular to said declination shaft axis 30 to aid in positioning and supporting said sun ray collectors 16 and reflectors 17. Said mount structure 15 is caused to rotate about said declination shaft axis 30 by rotational means 20 at the rate of one revolution per year. Direction of rotation of means 20 may be either clockwise or counterclockwise.

It is this annual rotation of said mount structure 15 about said declination shaft axis 30 that causes said sun ray collectors 16 and reflectors 17 to follow the sun in its seasonal course while the daily rotation of said shaft-connecting means 11 by rotational means 19 causes said sun ray collectors 16 and reflectors 17 to follow the sun in its diurnal course.

D. Additionally, when used with said sun ray reflectors 17, (see FIGS. 5 and 6), upper element 32 is rotated in the direction of arrow "C" by rotational means 21 at a rate one-half rotational means 19 speed (arrows "B"). Half speed rotation in the direction of arrow "C" when subtracted from daily rotation of said shaft-connecting means 11 by means 19 (arrows "B") results in upper element 32 revolving in the direction of arrow "D" but at one-half the speed of rotational means 19.

III. Of Corrective Compensation

In addition to the invention and modifications thereto referred to in the foregoing discussion of FIGS. 1-6, there are further rotational means modifications shown in FIGS. 7-10 inclusive, wherein rotational compensation is applied to the main rotational means 19 and 20 in order to correct for the predictable but non-uniform time relationship between the earth and sun as a result of the earth's elliptic orbit around the sun. Such corrective compensation will result in perfect tracking accuracy if the small amount of atmospheric refraction of the sun's rays is disregarded.

A. Referring to FIGS. 7 and 8, worm gear 35 of rotational means 20 is positioned eccentrically to declination shaft axis 30. Motor of rotational means 20 is mounted on a radially moving mounting pad 36 in order to keep said rotational means 20 properly enmeshed throughout its eccentric travel. The amount of eccentricity (arrows "A") is determined by pro-rating the time between equinoxes measured through summer and through winter, and it will be appreciated that the direction of eccentricity must be appropriately oriented relative to sun ray collector 16 and reflector 17 position on said mount structure 15. A detailed background discussion of corrective compensation is set forth in the aforementioned pending application, therefore only the essential conclusions have been mentioned in this specification.

B. Referring to FIGS. 9 and 10, rotational means 19 is relocated on a pivotly connected arm 37 having follower 38 and said rotational means 19 has added to it the oscillating movement of cam 39 which is rotated one revolution per year by rotational means 40. The curve for cam 30 is determined by "equation of time" data available in the ephemeris of a nautical almanac. Cam 39 is shown cylindrical, but a plate type cam is also effective.

IV. Of More Realistic Proportions

Figure 12:
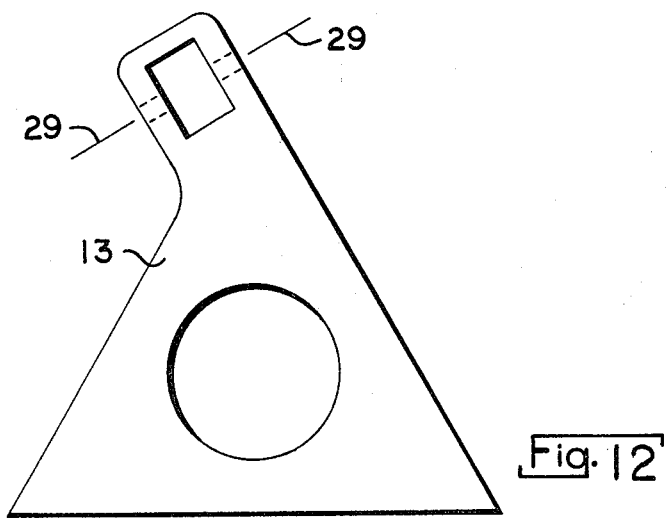
FIG. 12 is a side elevational view depicting a preferred support structure to that of FIG. 11 when utilizing reversible means for rotation of the shaft-connecting means.

Finally, having reference to the drawings, FIGS. 11 and 12 inclusive, a conception of the invention with more realistic proportions is depicted.

A. FIG. 11 illustrates the invention as depicted in FIG. 1 but with a parabolic or spherical dish type collector 16 and a support structure 13 for a latitude of 30° north or south of the equator. FIG. 11 also shows the type of support structure 13 which would be required if collector 16 is daily rotated through 360°.

B. In FIG. 12, a more rigid support structure 13 is shown, wherein rotational means 19 are reversible, reversing direction in the evening and pointing collector 16 skyward throughout the night until rotational means 19 are again reversed in the morning. Reversing means such as electronic reference signal may be used, or said rotational means 19 may be set to automatically reverse itself at twelve hour intervals.

V. Of Preferred Embodiment

A. The invention's preferred embodiment comprises those parts illustrated in FIG. 11 with the option for appropriate means for corrective compensation as shown in FIGS. 7, 8, 9 and 10. Type of sun ray collector 16 and receiver target 18 are at the operator's discretion.

B. It should be pointed out that sun ray collector 16, reflector 17 and receiver target 18 form no part of the invention per se. The instant invention is an AUTOMATIC BIAXIAL SUN TRACKING MECHANISM. It is the inventor's intent that said mechanism be used for SUN RAY UTILIZATION DEVICES such as the collector 16 dish and target 18 combination illustrated in FIG. 11. However, there are many types of sun ray utilization devices on the market and, doubtlessly, many which have yet to be invented. The instant invention is an automatic biaxial sun tracking mechanism to be used with whatever sun ray utilization system or device that now is or will become most desireable.

VI. Of Miscellaneous Alternates

It is of course to be understood, however, that the particular embodiments of the invention herein disclosed are for illustrative purposes only, and that various changes in design, structure and arrangements may be made therein without departing from the spirit and scope of the invention or appended claims.

With respect to the above mentioned various changes in design, structure and arrangement:

A. Rotational means 19, 20, 21 and 40 shown throughout the figures are constant speed synchronous clock motors with worms enmeshing worm gears. Other forms of rotational means may be used such as: chains and sprockets, belts and pulleys, spur gears, bevel gears, peg gears, etc. which may be actuated by unidirectional or reversible, continuously operable or intermittently operable, and electrical or mechancial means.

B. Rotational means 19, 20, 21 and 40 shown throughout the Figures may be mounted in a variety of ways in order to obtain the same result: For instance, a gear may be rotated by a relatively stationary motor (as in rotational means 19 of FIG. 1), or a motor may be rotated around a relatively stationary gear (as in rotational means 19 of FIG. 5), and etc.

C. The invention may carry a plurality of said sun ray collectors 16 and reflectors 17 with respective receiver targets 18, and there may be a plurality of inventions wherein one or more slave tracking mechanisms derive their operation from a master tracking mechanism.

Having thus described my invention, what I claim as new and desire by Letters Patent of the United States is:

1. An automatic biaxial sun tracking mechanism for sun ray utilization devices comprising means for continuously orienting said devices relative to the sun, said means including:
   A. a shaft-connecting means to provide a fixed angular relationship of the longitudinal axes of a polar shaft and a declination shaft;
   B. a polar shaft suitably supported so that its longitudinal axis is oriented parallel to the earth's axis of rotation, and said polar shaft having suitable means to rotate said shaft-connecting means about said longitudinal axis of said polar shaft;
   C. a declination shaft rotatably connected to said shaft-connecting means, and having suitable means for rotation about its longitudinal axis, and having connected to it by suitable means a mount structure;
   D. a mount structure for supporting and positioning said sun ray utilization devices, and said mount structure having suitable means for rotation about the longitudinal axis of said declination shaft.

2. In a mechanism as defined in claim 1, wherein said declination shaft has its longitudinal axis held in such relation to the longitudinal axis of said polar shaft that will permit said declination shaft to remain perpendicular to the sun's ecliptic plane.

3. In a mechanism as defined in claim 1, wherein:
   A. said declination shaft has its longitudinal axis held in such relation to the longitudinal axis of said polar shaft that will permit said declination shaft to remain perpendicular to a plane which bisects the earth's equatorial plane and the sun's ecliptic plane;
   B. said mount structure has an upper element on which said sun ray utilization device is mounted, rotatably connected to said mount structure and with suitable means for rotation relative to said mount structure.

4. In a mechanism as defined in claim 2, wherein mechanism movement is as follows:
   A. said shaft-connecting means rotates uniformly about the longitudinal axis of said polar shaft one revolution per day in a direction opposite to the earth's axial rotation;
   B. said mount structure rotates uniformly with said declination shaft one revolution per year.

5. In a mechanism as defined in claim 3, wherein mechanism movement is as follows:
   A. said shaft-connecting means rotates uniformly about the longitudinal axis of said polar shaft one revolution per day in a direction opposite to the earth's axial rotation;
   B. said mount structure rotates uniformly with said declination shaft one revolution per year;
   C. said upper element rotates uniformly relative to said mount structure in a direction opposite to and at a speed one-half of said shaft-connecting means rotation.

6. In a mechanism as defined in claim 1, wherein corrective compensation (non-uniform movement) is superimposed upon said means for rotation of said declination shaft by orienting said means for rotation in an eccentric position relative to the longitudinal axis of said declinatin shaft.

7. In a mechanism as defined in claim 1, wherein corrective compensation is applied to means for rotation of said shaft-connecting means by pivotly mounting said means for rotation so that it may have superimposed upon it the additional movement of a follower engaging a cam having suitable means to rotate uniformly one revolution per year relative to a support structure for said cam.

8. In a mechanism as defined in claim 1, wherein each said means for rotation is one of the following:
   A. unidirectional and continuously operable,
   B. unidirectional and intermittently operable,
   C. reversible and continuously operable,
   D. reversible and intermittently operable.

* * * * *